(12) United States Patent
Nagae

(10) Patent No.: US 8,515,273 B2
(45) Date of Patent: Aug. 20, 2013

(54) LENS BARREL

(75) Inventor: Ryuichi Nagae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/208,038

(22) Filed: Aug. 11, 2011

(65) Prior Publication Data

US 2012/0038985 A1    Feb. 16, 2012

(30) Foreign Application Priority Data

Aug. 16, 2010   (JP) .................. 2010-181720

(51) Int. Cl.
*G03B 17/00*    (2006.01)
(52) U.S. Cl.
USPC ........................................... 396/55; 396/542
(58) Field of Classification Search
USPC ............................................. 396/52, 55, 542
See application file for complete search history.

(56) References Cited

U.S. PATENT DOCUMENTS

| | | | | |
|---|---|---|---|---|
| 4,864,348 A | * | 9/1989 | Fujiwara et al. | 396/542 |
| 4,999,656 A | * | 3/1991 | Shimizu et al. | 396/89 |
| 5,559,571 A | * | 9/1996 | Miyamoto et al. | 396/52 |
| 2012/0038985 A1 | * | 2/2012 | Nagae | 359/554 |

FOREIGN PATENT DOCUMENTS

| | | |
|---|---|---|
| JP | 7-159668 A | 6/1995 |
| JP | 2008-065179 A | 3/2008 |

* cited by examiner

*Primary Examiner* — WB Perkey
(74) *Attorney, Agent, or Firm* — Canon USA Inc IP Division

(57) ABSTRACT

A lens barrel that includes a first rectilinear motion barrel, a second rectilinear motion barrel whose rotation around an optical axis is restricted by the first rectilinear motion barrel, a first flexible printed circuit board whose electrical connection is performed from outside of the barrel, a second flexible printed circuit board whose electrical connection is performed from outside of the barrel, and a connection unit configured to connect the first flexible printed circuit board and the second flexible printed circuit board. The connection unit is placed in a space configured by the first rectilinear motion barrel and the second rectilinear motion barrel.

5 Claims, 14 Drawing Sheets

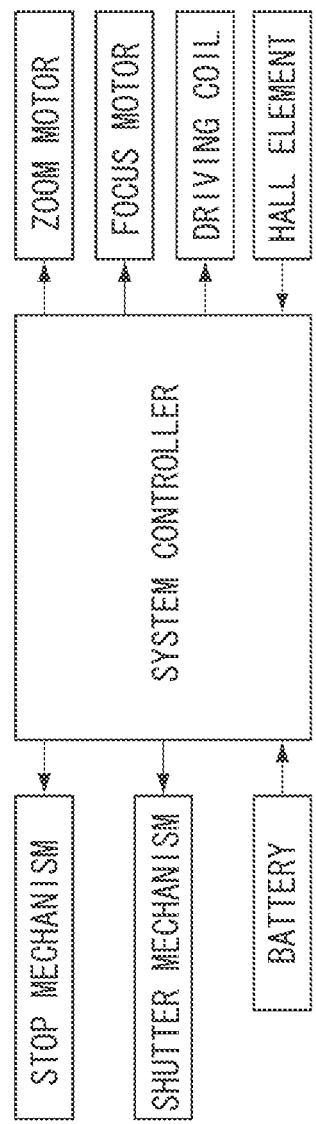

LENS BARREL

BACKGROUND OF THE INVENTION

1. Field of the Invention

The present invention relates to a lens barrel attached to a camera or the like and, more particularly, to a lens barrel that has a plurality of cylindrical members configured to advance and retreat rectilinearly in parallel with the direction of an optical axis and a plurality of actuators electrically driven within the lens barrel.

2. Description of the Related Art

In recent years, zoom lens barrels used in digital cameras and the like have shown a tendency that a focal-length ratio (what is called a zoom magnification) is large, and thus, a moving-distance (more particularly, a moving-distance towards an object side or a moving-distance towards an imaging plane side) of a photographing lens in a lens barrel used in a camera is large. On the other hand, from a viewpoint of enhancing portability of cameras, there have been demands for reduction in size of cameras and lens barrels. In other words, a lens barrel has been required, which is adapted such that when electric-power is on, the moving-distance of the photographing lens is large, and when electric-power is off, the lens barrel is compactly fit into the camera.

As the camera enhances its functions, the lens barrel has come to be provided with not only a stop mechanism and a shutter mechanism but a novel mechanism typified by a new mechanism (such as a camera-shake correction mechanism).

In addition, in order to achieve function enhancement of the camera, the lens barrel has many actuators for driving the stop mechanism, the shutter mechanism, and the camera-shake mechanism, which are electrically connected to a system controller, and many detection elements for controlling various mechanisms.

In such a lens barrel, lead wires and a plurality of flexible printed circuit boards are used to electrically connect the system controller to the actuators and the detection elements provided therein.

Hitherto, a lens barrel using two flexible printed circuit boards has been proposed. The lens barrel has a first flexible printed circuit board for connecting a driving source of each of an antivibration driving mechanism and a shutter driving mechanism to an electrical control means provided outside the barrel. In addition, the lens barrel has a second flexible printed circuit board for connecting a driving source of a focusing mechanism to the electrical control means provided outside the barrel. The first flexible printed circuit board and the second flexible printed circuit board are arranged to be wired around within the lens barrel in a two-ply state. For example, Japanese Patent Application Laid-Open No. 07-159668 discusses that a soldered part of the first flexible printed circuit board is connected to an electric component, such as a motor arranged in the lens barrel, perpendicular to an optical axis by soldering.

For example, Japanese Patent Application Laid-Open No. 2008-65179 has proposed and discussed a lens barrel in which an image stabilization (IS) flexible printed circuit board and a shutter (SH) flexible printed circuit board are wired around in a two-ply state. In the case of the lens barrel, the IS flexible printed circuit board and the SH flexible printed circuit board are drawn out of the lens barrel in a two-ply state and connected to a control printed circuit board, on which a central processing unit (CPU) is mounted, in a digital camera.

If the above lens barrel is configured such that the flexible printed circuit boards are wired in a two-ply state, a reaction force at bending of the flexible printed circuit boards is large (what is called high resilience). Because the two-ply flexible printed circuit board is high in resilience, an unwanted force acts upon the actuator, to which the flexible printed circuit boards are attached, and the like. Thus, operations of the actuators and the lens barrel are destabilized.

In addition, as described above, in the configuration in which the soldered part on the flexible printed circuit board is arranged perpendicular to the optical axis, a size of the lens barrel becomes large in the direction of a diameter.

If a digital camera is configured by drawing the two-ply flexible printed circuit board out of the lens barrel and connecting the two-ply flexible printed circuit board to the control printed circuit board of the digital camera, a plurality of long and large flexible printed circuit boards should be used. Accordingly, the material cost of the flexible print circuit boards is high. This causes increase in the cost of the lens barrel.

SUMMARY OF THE INVENTION

The present invention aims at providing a lower-priced lens barrel by miniaturizing flexible printed circuit boards used therein and simplifying the configuration thereof.

According to an aspect of the present invention, a lens barrel includes a first rectilinear motion barrel, a second rectilinear motion barrel whose rotation around an optical axis is restricted by the first rectilinear motion barrel, a first flexible printed circuit board electrically connected from outside of the barrel, a second flexible printed circuit board electrically connected from outside of the barrel, and a connection unit configured to connect the first flexible printed circuit board and the second flexible printed circuit board. The connection unit is placed in a space configured by the first rectilinear motion barrel and the second rectilinear motion barrel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a block diagram illustrating a primary part of an electric system in a lens barrel according to the exemplary embodiment of the present invention.

DESCRIPTION OF THE EMBODIMENTS

Various exemplary embodiments, features, and aspects of the invention will be described in detail below with reference to the drawings.

Hereinafter, a lens barrel, according to an exemplary embodiment of the present disclosure, is described with reference to the accompanying-drawings. First, a structure of the lens barrel according to the present exemplary embodiment is described hereinafter with reference to an external perspective view illustrated in FIG. 2.

Figure 2:
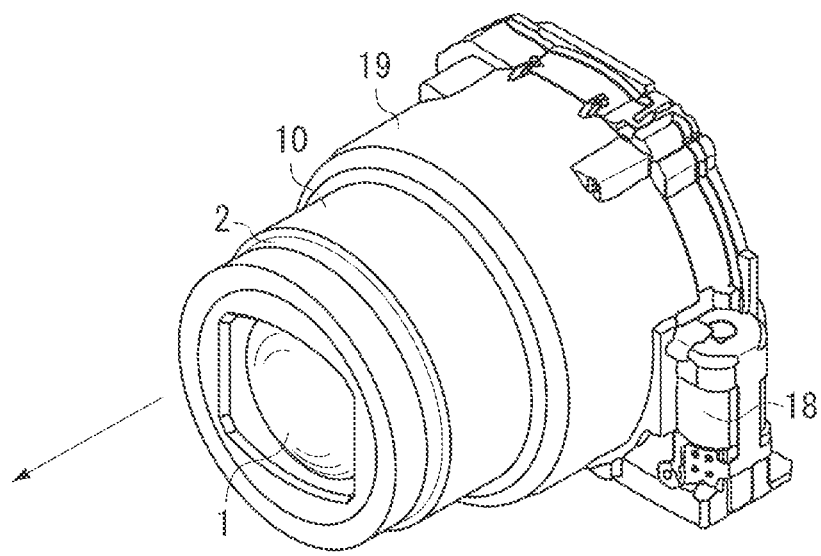
FIG. 2 is an external perspective view illustrating the lens barrel according to the exemplary embodiment of the present invention.

As illustrated in FIG. 2, the lens barrel includes a first group photographing lens 1, a first group rectilinear motion barrel 2, an outer rotating barrel 10, a zoom motor 18 for driving the lens barrel, and a lens barrel cover 19 constituting an appearance of the lens barrel. In FIG. 2, a side located in a direction of an arrow is defined as an object side. The side opposite to the object side is defined as an imaging plane side. A side located in an inwardly radial direction around the center of a circumference, which corresponds to an optical axis (i.e., an axis extending in the direction of the arrow and substantially centered relative to the first group photographing lend 1) of the lens barrel, is defined as an inner circumference side. A side located in a radial direction away from the center is defined as an outer circumference side.

Next, a first group photographing lens through a third group photographing lens of the lens barrel are described with reference to a developed perspective view of the lens barrel illustrated in FIG. 3, and a central cross-sectional view thereof illustrated in FIG. 4.

In the lens barrel, the first group photographing lens 1 is located at the side closest to the object side in the direction of the optical axis. The first group photographing lens 1 is attached to the first group rectilinear motion barrel 2. A plurality of cam pin 2a is provided on the inner circumference side of the first group rectilinear motion barrel 2 to protrude therefrom. The cam pins 2a are engaged with a cam barrel 9 which will be described below. In addition, an engaging part (not shown) restricted by an inner rectilinear motion barrel 8 from rotating is provided on the inner circumference side of the first group rectilinear motion barrel 2.

Figure 3:
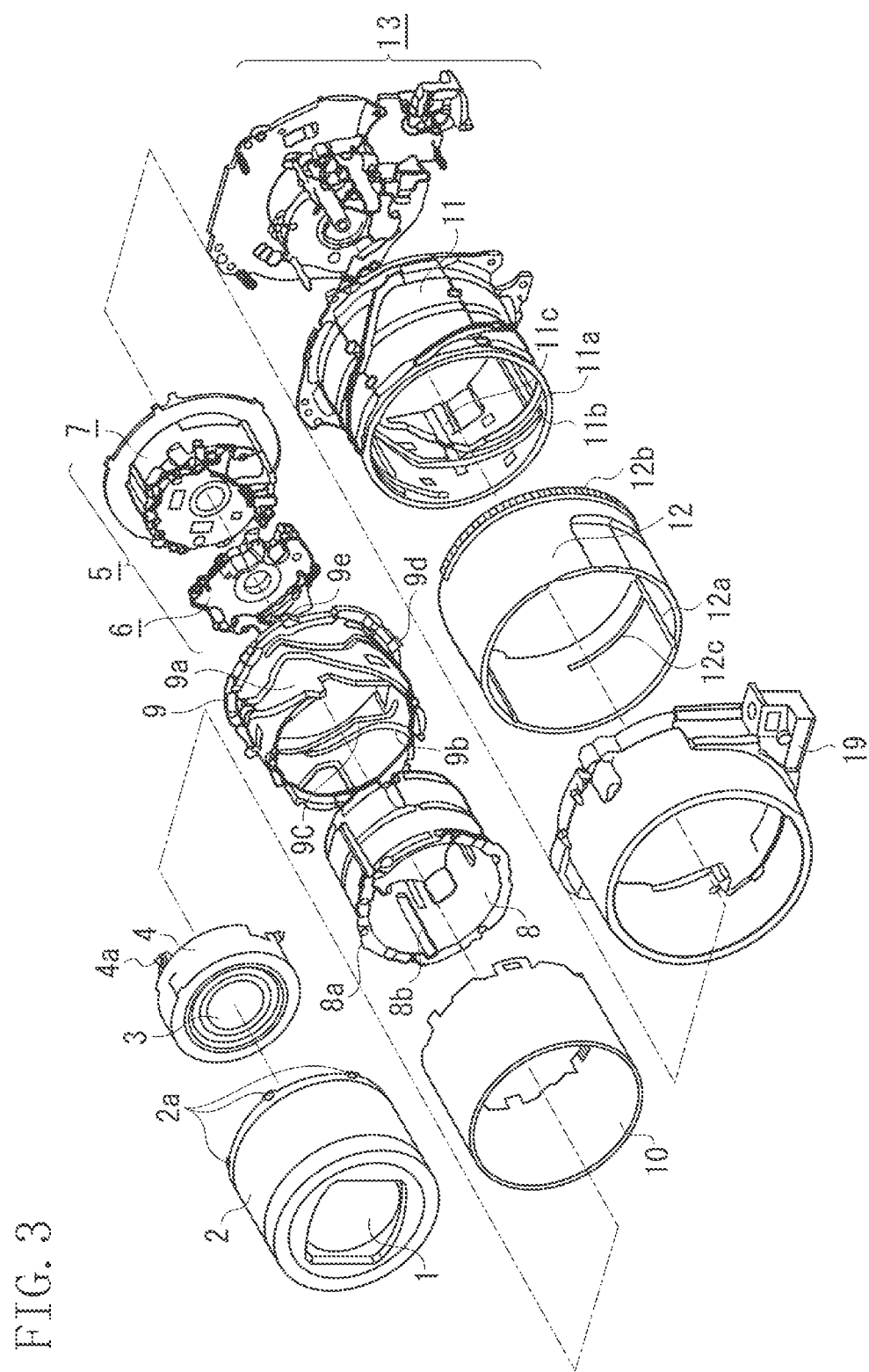
FIG. 3 is an exploded perspective view illustrating the lens barrel according to the exemplary embodiment of the present invention.
Figure 4:
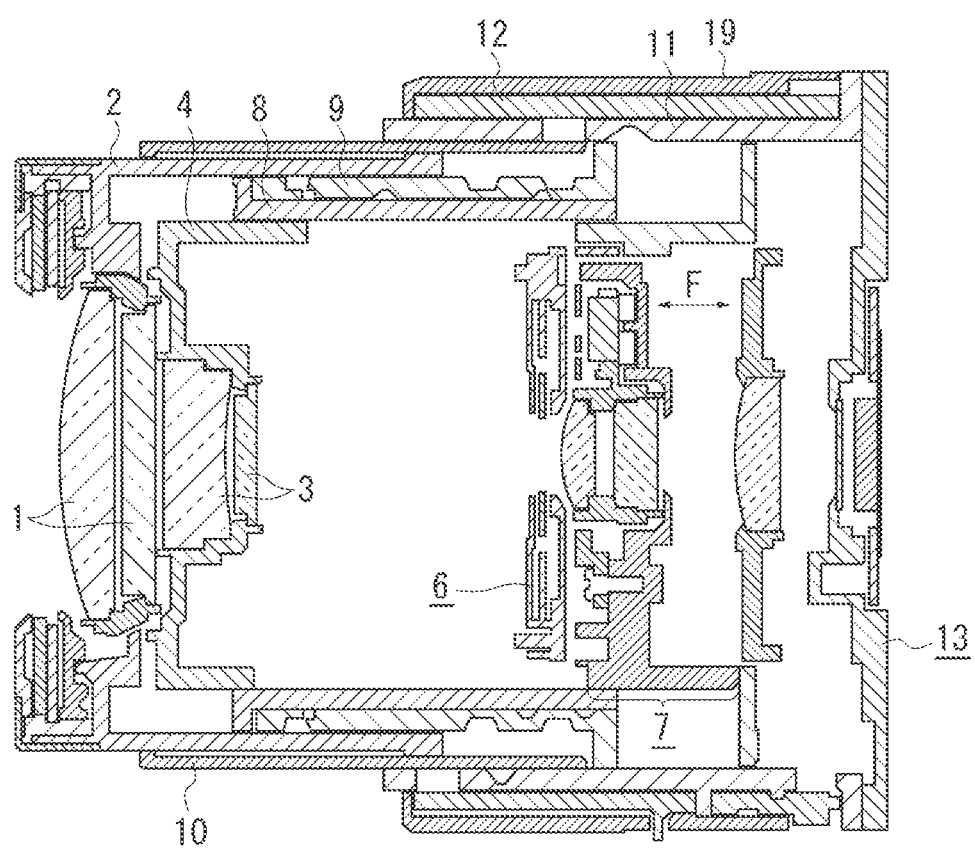
FIG. 4 is a longitudinal cross-sectional view illustrating the lens barrel according to the exemplary embodiment of the present invention.

As illustrated in FIGS. 3 and 4, a second group photographing lens 3 is fixed to a second group lens holder 4. The second group lens holder 4 has cam pins 4a which engage with a driving barrel 12 and are provided at a plurality of places thereon. In addition, the second group lens holder 4 has engaging-parts (not shown) whose rotation is restricted at root portions of the cam pins 4a by the inner rectilinear motion barrel.

As illustrated in FIG. 3, a third group unit (moving-unit) 5 movably mounted in the lens barrel includes a stop-shutter unit (second member) 6 and a third group lens unit (first member) 7.

Figure 5:
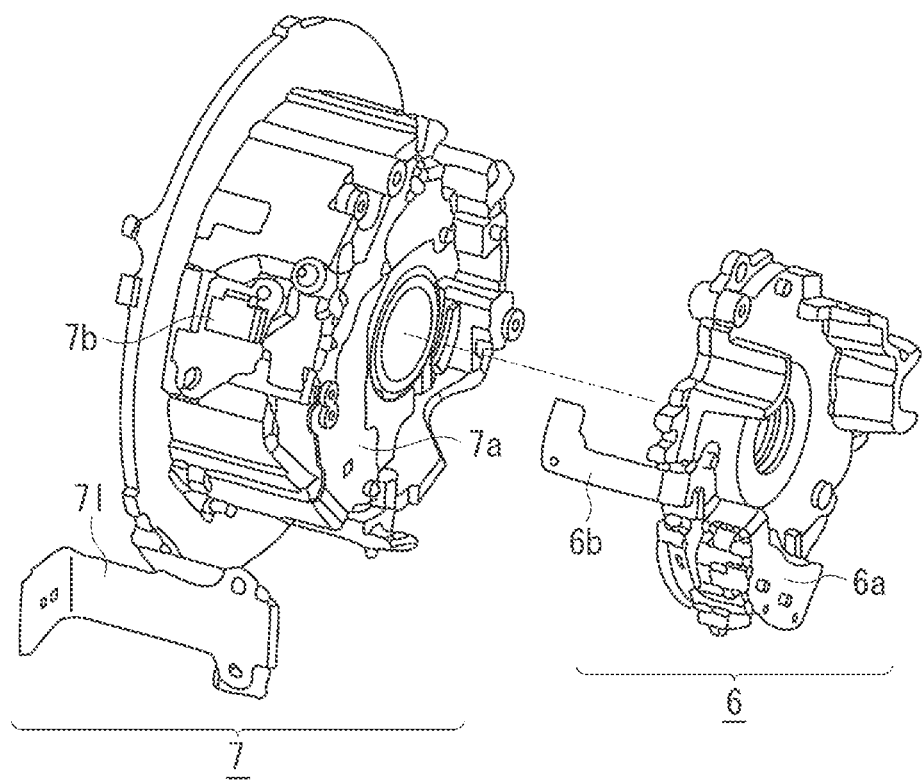
FIG. 5 is an exploded perspective view illustrating a stop-shutter unit and a third group lens unit of the lens barrel according to the exemplary embodiment of the present invention.

The third group lens unit 7 and the stop-shutter unit 6 are described in detail hereinafter with reference to FIGS. 5 through 7.

As illustrated in FIG. 3 which is an exploded perspective view of the stop-shutter unit 6 and the third group lens unit 7, the stop-shutter unit (second member) 6 is fasten to the third group lens unit (first member) 7 by screws in a lens barrel assembled state.

The stop-shutter unit (second member) 6 includes a stop mechanism (second electric component) for adjusting a size of an optical path, and a shutter mechanism (second electric component) for opening/closing the optical path. Each of the stop mechanism and the shutter mechanism is an electric component driven by an electric actuator.

In order to electrically connect a system controller of a camera to the electric actuator for the stop mechanism and the shutter mechanism, a second flexible printed circuit board 6a is attached onto the stop-shutter unit (second member) 6. An extension part 6b of the second flexible printed circuit board 6a is folded towards a connector 7b of a first flexible printed circuit board 7a arranged on a side surface part of the third group lens unit 7 to be wired around within the barrel.

Consequently, the second flexible printed circuit board 6a is connected to the first flexible printed circuit board 7a via the connector 7b.

Figure 6:
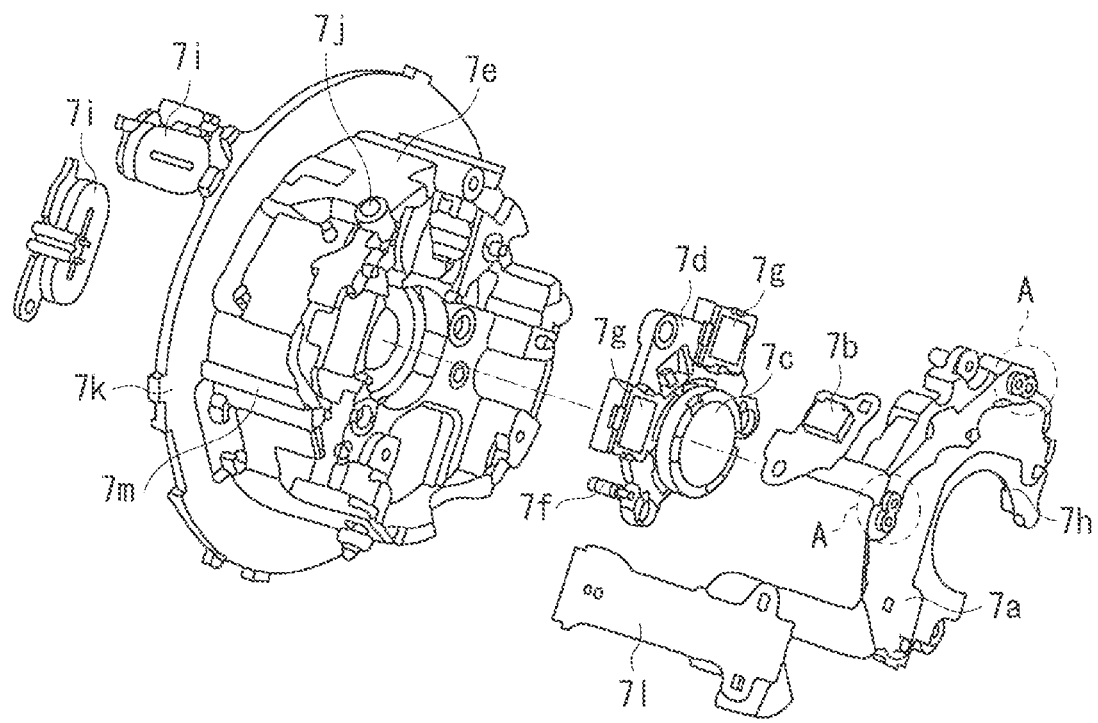
FIG. 6 is an exploded perspective view illustrating the third group lens unit of the lens barrel according to the exemplary embodiment of the present invention.
Figure 7:
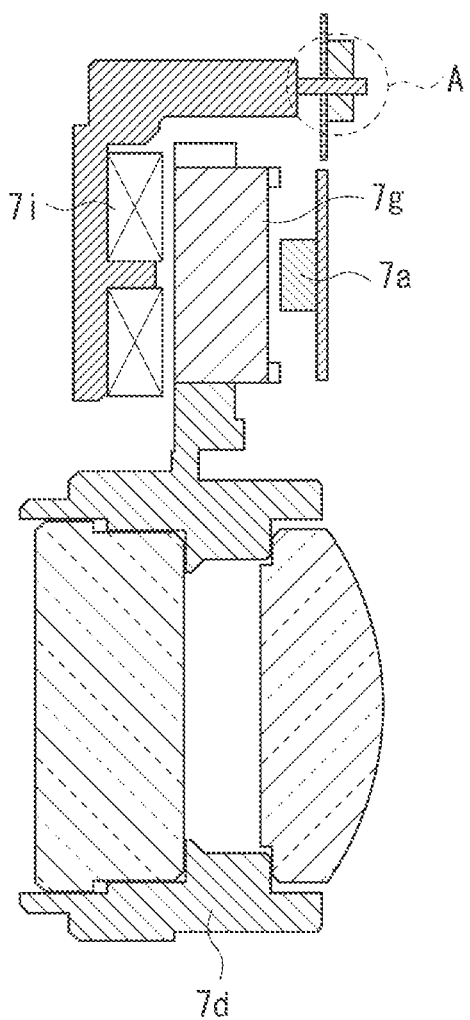
FIG. 7 is a schematic cross-sectional view illustrating a driving coil part of a third group barrel of the lens barrel according to the exemplary embodiment of the present invention at assembly thereof.

As illustrated in an exploded perspective view illustrated in FIG. 6, a camera-shake correction mechanism (first electric component) configured by an actuator serving as a driving coil for camera-shake correction is installed in the third group lens unit (first member) 7. In addition, a third group photographing lens 7c, a third group lens holder 7d for holding the third group photographing lens 7c, and a third group barrel (first rectilinear motion barrel) 7e are installed in the third group lens unit (first member) 7.

A plurality of urging-springs 7f are provided to hang between the third group lens holder 7d and the third group barrel 7e. In the assembled state, the third group lens holder 7d is urged (i.e., applying a force) by the urging spring 7f in a direction in which the third group lens holder 7d is press-contacted with the third group barrel 7e.

A driving magnet 7g is arranged integrally with the third group lens holder 7d. When the system controller energizes a driving coil 7i to generate a magnetic field so that the driving magnet 7g is subjected to a magnetic force, the third group lens holder 7d is enabled to change its position with respect to the optical axis. Thus, camera-shake correction can be performed.

As illustrated in FIG. 6, a sensor holder 7h is attached to a side closer to the object side than the third group lens holder 7d, and fixed to the third group barrel 7e with screws. A first flexible printed circuit board 7a is attached to the object side of the sensor holder 7h.

A detection element (hall element (not shown)) for detecting change in a magnetic field, or magnetism, is arranged at a place facing the driving magnet 7g of the third group lens holder 7d in the first flexible printed circuit board 7a. The first flexible printed circuit board 7a is fixed to the sensor holder 7h. The sensor holder 7h is fixed to the third group barrel 7e with screws. Thus, the hall element can be fixed to the third group barrel 7e with good precision. Accordingly, a position of the lens holder 7d can be detected with good precision.

The driving coil 7i is attached to an imaging-plane-side of the third group barrel 7e. As illustrated in a cross-sectional schematic view of the driving coil 7i at the time of assembling illustrated in FIG. 7, a soldered part of the driving coil 7i protrudes to the object side in the direction of the optical axis so as to stride the third group lens holder 7d. The soldered part of the driving coil 7i is electrically connected thereto at a soldered part A of the first flexible printed circuit board 7a. Consequently, the hall element and the driving coil 7i are electrically connected to the first flexible printed circuit board 7a.

An extension part 71 to be extended to the outside of the lens barrel is formed on the first flexible printed circuit board 7a, at a place different in phase in a rotation direction of the barrel, from the connection part connected to the second flexible printed circuit board. The extension part 71 is connected to the barrel 7e by the connector 7b. The lens barrel is configured such that a signal is communicated from the second flexible printed circuit board 6a to the system controller of the digital camera via the connector 7b.

As described above, the first flexible printed circuit board 7a processes signals from the stop-shutter mechanism (second electric component) of the stop-shutter unit 6 and the camera-shake correction mechanism (first electric component) of the third group barrel 7e. The third group barrel 7e includes a plurality of cam pins 7j engaging with a cam barrel 9 described below, a rectilinear motion restriction key 7k to be rotation-restricted by a stationary barrel 11, and a key 7m for regulation of rotation of an inner rectilinear motion barrel 8.

Next, the rectilinear motion barrels that the lens barrel has are described hereinafter with reference to FIGS. 3 and 4.

The inner rectilinear motion barrel (second rectilinear motion barrel) 8 is placed at an outer circumference part of the third group lens unit 7. The rotation of the inner rectilinear motion barrel (second rectilinear motion barrel) 8 is restricted by the rotation restriction key 7m of the third group barrel 7e. The inner rectilinear motion barrel (second rectilinear motion barrel) 8 is attached to the third group lens unit 7 and can advance and retreat only in the direction of the optical axis.

A rotation restriction part 8a is provided on the inner rectilinear motion barrel 8 and supports the first group rectilinear motion barrel 2 which can advance and retreat only in the direction of the optical axis. The rotation restriction part 8a restricts rotation of the first group rectilinear motion barrel 2.

In addition, a rectilinear motion groove 8b for restricting the rotation of the second group lens holder 4 is provided on the inner rectilinear motion barrel 8.

A cam barrel 9 is detachably attached to the outer circumference part of the inner rectilinear motion barrel 8, utilizing what is called a bayonet structure. Thus, the inner rectilinear motion barrel (second rectilinear motion barrel) 8 operates integrally with the cam barrel 9 in the direction of the optical axis.

A first group cam groove 9a for driving the first group rectilinear motion barrel 2 is formed at an outer circumference side in the direction of the optical axis of the cam barrel 9.

In addition, a second group cam groove 9b for driving the second group lens holder 4, and a third group cam groove 9c for driving the third group barrel 7e are formed on the inner circumference side of the cam barrel 9. Besides, a cam pin 9d engaging with a cam groove 11a of a stationary barrel 11, which will be described below, together with a driving pin 9e engaging with the driving barrel 12, are formed on the outer circumference part of the cam barrel 9.

The outer rotating barrel 10 is attached to the cam barrel 9 to cover the outer circumference of the first group rectilinear motion barrel 2. The outer rotating barrel 10 is fixed to the cam barrel 9 by what is called a snap-fit mechanism. Consequently, the outer rotating barrel 10 rotates integrally with the rotation of the cam barrel 9 and advances and retreats in the direction of the optical axis thereof.

The stationary barrel 11 is arranged on the outer circumference part of the outer rectilinear motion barrel 10. A cam groove 11a engaging with the cam pin 9d formed on the cam barrel 9 is formed on the inner circumference part of the stationary barrel 11.

In addition, a driving hole 11b serving as a through hole is bored in the stationary barrel 11 such that the driving pin 9e of the cam barrel 9 passes through the hole. Besides, a rotation restriction groove 11c engaging with the third group ration restriction key 71 of the third group barrel 7 to restrict the rotation of the third group barrel 7e is formed on the stationary barrel 11.

The driving barrel 12 is rotatably attached with respect to the stationary barrel 11 to the outer circumference part of the stationary barrel 11. A rotating groove 12a engaging with the driving pin 9e of the cam barrel 9 is provided on the driving barrel 12. A gear part 12b adapted to operate via a gear (not shown) interlocking with the zoom motor 18 is formed on the outer circumference part of the driving barrel 12. In addition, a flexible groove 12c serving as a slit-like opening for discharging the flexible printed circuit board to the outside of the les barrel is formed on the driving barrel 12.

Figure 8:
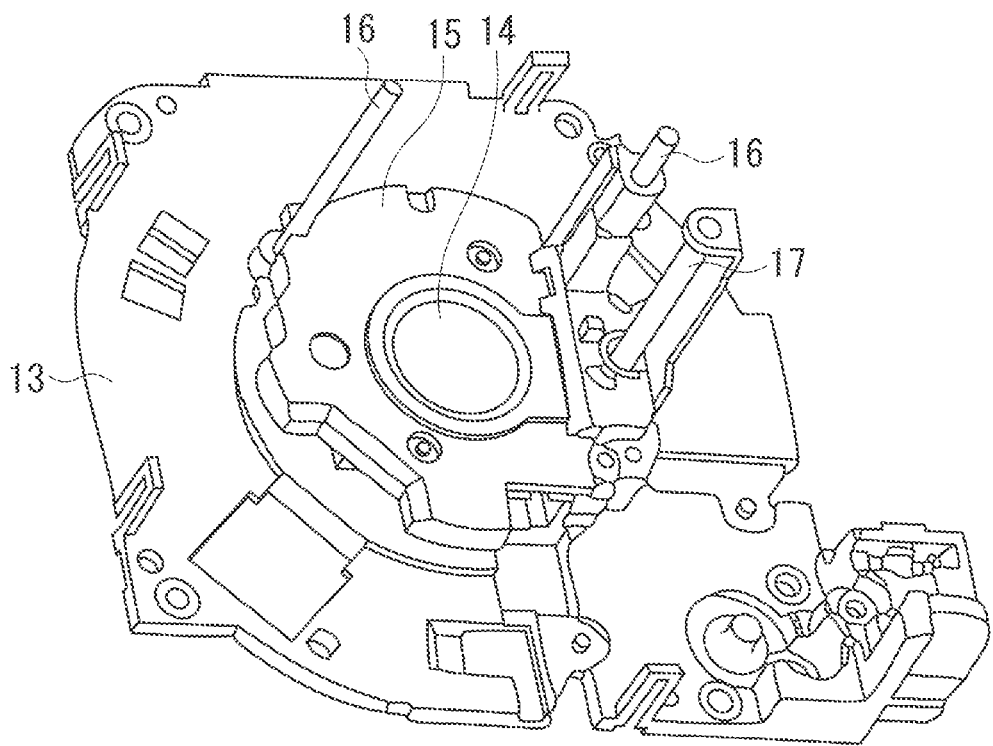
FIG. 8 is an explanatory view illustrating a fourth lens unit of the lens barrel according to the exemplary embodiment of the present invention.

Next, a fourth group lens unit (charge-coupled device (CCD) holder unit) is described hereinafter with reference to a perspective view illustrated in FIG. 8.

The fourth group lens unit (base unit serving as a CCD holder) 13 includes an image sensor (not shown). In addition, two stabilization shafts 16 are erected on the fourth group lens unit 13 serving as the base unit. A fourth lens holder 15 is attached to the two stabilization shafts 16 formed on the fourth group lens unit 13 to rectilinearly advance and retreat.

In addition, a screw-feed mechanism is attached between the fourth group lens unit 13 and the fourth lens holder 15. The screw feed mechanism is configured by a driving nut provided in the fourth lens holder 15 and meshes with a screw shaft of the focus motor 17 attached to the fourth group lens unit 13. In the screw feed mechanism, control current is fed from the system controller of the camera to the focus motor 17 so as to rotate the screw shaft of the focus motor 17 by a predetermined angle. Consequently, motion of the fourth lens holder 15 is controlled integrally with the driving nut. The motion-controlled fourth lens holder 15 performs an operation of rectilinearly advancing/retreating in the direction of the optical axis by a predetermined distance.

The fourth lens holder 15 attached to the fourth group lens unit 13 holds a fourth photographing lens 14 arranged in rear of the third group barrel 7e.

Next, a primary part of an electrical system in the lens barrel according to the present exemplary embodiment is described hereinafter with reference to a block diagram illustrated in FIG. 9.

When the lens barrel is attached to a digital camera to be used, electric power is supplied to the system controller of the lens barrel from a battery provided in the camera. In addition, a signal line for receiving a signal from the hall element is connected to the system controller. Electric power for driving the stop mechanism and the shutter unit of the stop-shutter unit 6, electric power for energizing the driving coil 7i, electric power for driving the focus motor, electric power for the zoom motor, and the like are supplied from the system controller.

When the power supply of the digital camera is turned on, electric power is supplied from the system controller of the lens barrel to each unit to set the camera in a photographable state, and then the camera stands by. When the power supply of the camera is turned off, the supply of electric power to each unit is ceased. Then, the camera waits for the next photographing. Other electrical components are generally used, and based on known technology. Therefore, detailed description of such components is omitted.

Next, an operation of driving the lens barrel of the above configuration is described hereinafter.

When a main switch is turned on, a zoom motor 18 powered from the system controller of the lens barrel is rotated. Thus, a rotation driving force is transmitted from gears configuring a gear power transmission mechanism to the driving barrel 12 via the gear 12b. Accordingly, when the driving barrel 12 is rotated, the cam barrel 9 is rotated by the driving pin 9e engaged with the rotating groove 12a provided on the driving barrel 12.

The cam barrel 9 has the cam pin 9d engaging with the stationary barrel 11. Thus, when the cam barrel 9 is rotated, the cam barrel 9 goes out/back in the direction of the optical axis with respect to the stationary barrel 11 by a cam action. According to an operation of drawing out/back the cam barrel 9 in the direction of the optical axis, similarly, the inner rectilinear motion barrel (second rectilinear motion barrel) 8 for rotatably supporting the cam barrel 9 is drawn out/back in the direction of the optical axis.

At that time, the rotation of the inner rectilinear motion barrel 8 is restricted by the third group barrel 7e. In addition, the rotation of the third group barrel 7e with respect to the stationary barrel 11 is restricted. Accordingly, the inner rectilinear motion barrel 8, whose rotation with respect to the stationary barrel 11 is restricted via the third group barrel 7e, performs only operations of rectilinearly advancing/retreating.

When the inner rectilinear motion barrel 8 and the cam barrel 9 are drawn out and back with respect to the stationary barrel 11 in the direction of the optical axis, the cam action between the first group rectilinear motion barrel cam pin 2a and the first group cam groove 9a of the cam barrel 9 causes the first group rectilinear motion barrel 2 to go out/back to a desired position in the direction of the optical axis, following the action of the cam of the cam barrel 9.

Similarly, the rotation of the second group lens holder 4 with respect to the stationary barrel 11 is restricted by the cam action between the second group lens holder cam pin 4a and the second group cam groove 9b. Thus, the second group lens holder 4 extends or retreats to a desired position in the direction of the optical axis, following the action of the cam of the cam barrel 9.

The rotation of the third group barrel (first rectilinear motion barrel) 7e with respect to the stationary barrel 11 is restricted by the cam action between the third group barrel cam pin 7j and the third group cam groove 9c. Thus, the third group barrel (first rectilinear motion barrel) 7e extends or retreats to a desired position in the direction of the optical axis, following the action of the cam of the cam barrel 9.

More specifically, in the lens barrel, the driving barrel 12 is rotated by energizing the zoom motor 18. Thus, each of the first group photographing lens 1, the second group photographing lens 3, and the third group photographing lens 7c is moved to a desired position. Consequently, appropriate zoom photographing can be performed. The fourth group photographing lens 14 is configured to be singly drawn out/back by the focus motor 17 to an in-focus position corresponding to a zoom position.

Generally known techniques are utilized as a lens-barrel driving method. Therefore, a detailed description of such a method is omitted.

Next, the connection portion of each flexible printed circuit board of the lens barrel according to a primary part of the present exemplary embodiment is described hereinafter with reference to FIGS. 1, 10A, 10B, and 11.

Figure 1:
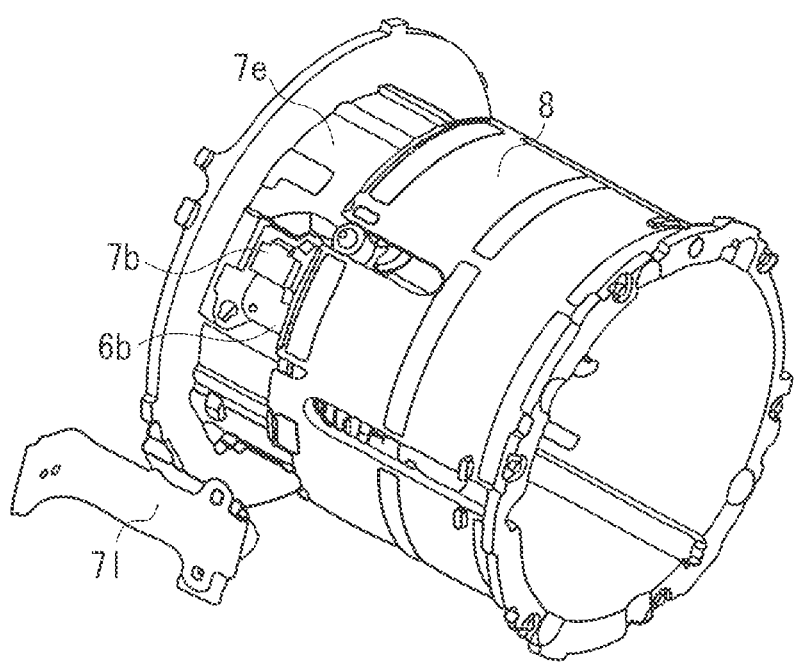
FIG. 1 is a perspective view illustrating a third group lens unit and a rectilinear motion barrel of a lens barrel according to an exemplary embodiment of the present invention.

In the lens barrel, as illustrated in FIG. 1, the second flexible printed circuit board 6a for supplying electric-power to the stop-shutter unit 6 is connected to the connector 7b provided on the first flexible printed circuit board 7a. The connector 7b is placed in a space between a side surface of the third group barrel (first rectilinear motion barrel) 7e and the inner rectilinear motion barrel (second rectilinear motion barrel) 8.

In order to place the connector 7b in the space between the third group barrel (first rectilinear motion barrel) 7e and the inner rectilinear motion barrel (second rectilinear motion barrel) 8, it is necessary that a receiving surface part of the connector 7b formed on the third group barrel (first rectilinear motion barrel) 7e faces toward the direction of arrow B. Consequently, the connector 7b is placed closer to the fourth group lens holder 15.

However, a motion of the fourth lens holder 15 is restricted by the stabilization shaft 16 to advance and retreat only in the direction of the optical axis. Thus, the space for placing the connector 7b can be obtained by cutting out a part other than the fourth photographing lens 14 so as to prevent such a part from interfering with the third group barrel 7e.

Figure 11:
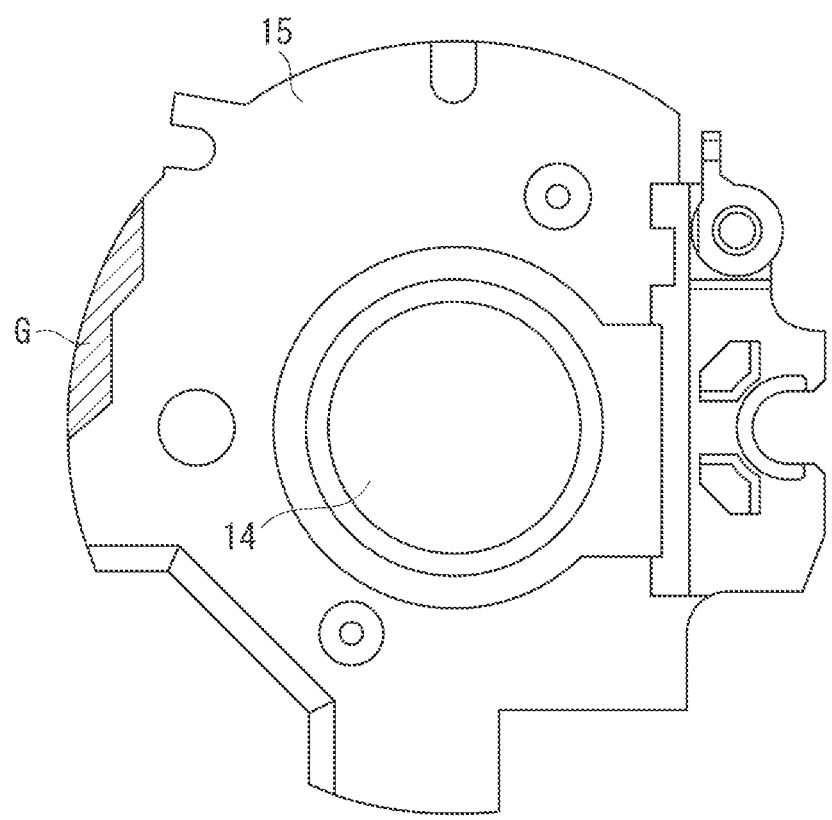
FIG. 11 is a plan view illustrating the fourth group lens unit of a lens barrel according to the exemplary embodiment of the present invention.

More specifically, the cutout part corresponds to a region G hatched by oblique lines, as illustrated in FIG. 11. Accordingly, the cutout part can be brought close to the fourth photographing lens 14. Thus, the receiving surface of the connector 7b placed on the third group barrel 7e can be provided at a position brought closer in the direction of arrow B without affecting movement of the fourth group lens holder 15.

If the size of the part (region G) cut out from the fourth lens holder 15 is set to be large, light enters the lens barrel around the fourth lens holder 15 during photographing. In addition, if light enters around the fourth lens holder 15 and reaches a sensor, a ghost (i.e. a ghost image or apparent image) or flare is generated in a photographed image. Thus, a user's desired image is not obtained. Accordingly, in view of influence upon photographed images, it is preferable that a region (i.e., the region G cut out from the fourth lens holder 15) in which the connector 7b is placed is as small as possible.

Figure 10A:
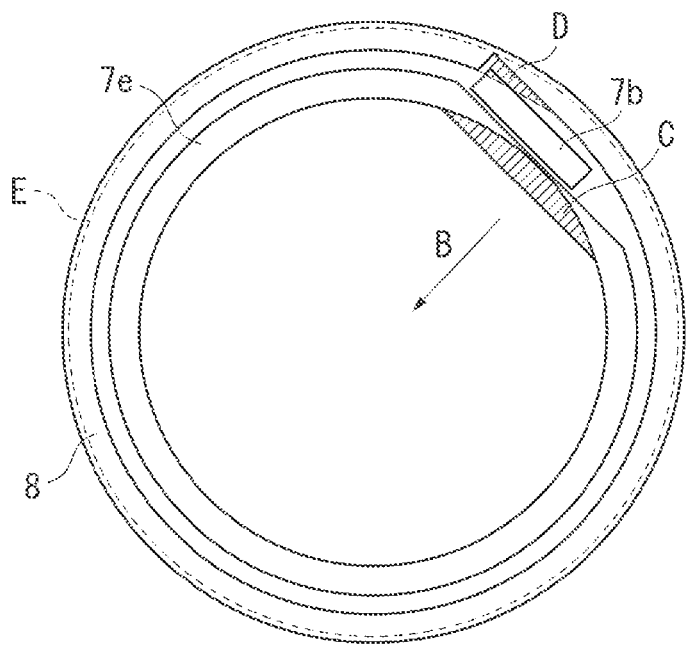
FIG. 10A is a schematic view illustrating the third group barrel, a connector, and an inner rectilinear motion barrel according to the exemplary embodiment of the present invention, seen from an imaging plane side.
Figure 10B:
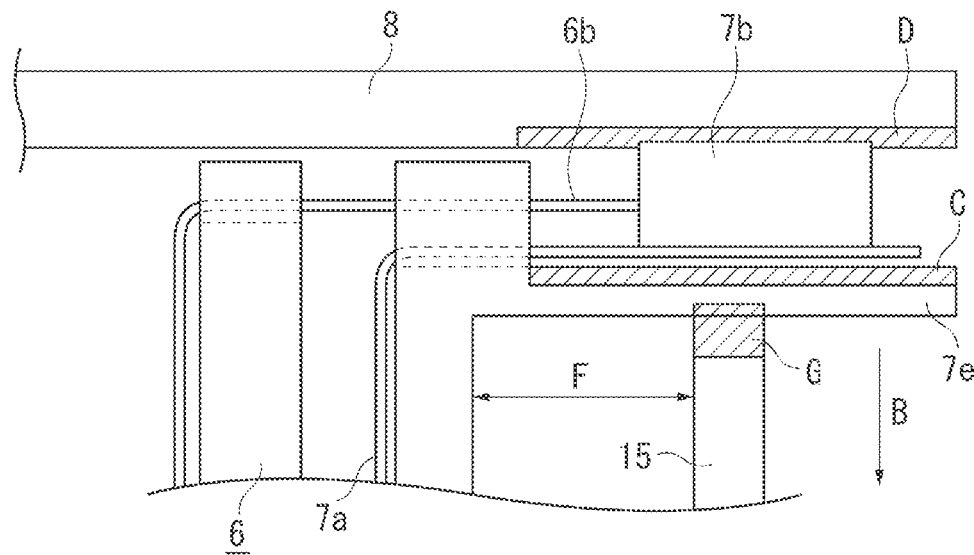
FIG. 10B is a schematic cross-sectional view illustrating a primary part of the barrels and the connector illustrated in FIG. 10A according to the exemplary embodiment of the present invention, which is taken along the optical or central axis thereof.

In the lens barrel according to the present exemplary embodiment, the inner rectilinear motion barrel 7e is provided around the outer circumference of the third group barrel 7e. Thus, in order to provide a space in a direction opposite to arrow B of the connector 7b, as illustrated in FIGS. 10A and 10B, a part D hatched with oblique lines is cut out from the inner rectilinear motion barrel (second rectilinear motion barrel) 8.

The third group barrel 7e and the inner rectilinear motion barrel 8 perform only relative advancement/retreat. Accordingly, in order to provide a region in which the connector 7b is placed, it is advisable to cut out only a part of the inner rectilinear motion barrel 8, which faces the connector 7b. Thus, the region in which the connector 7b is placed is easily provided. On the other hand, the third group barrel 7e restricts directly the rotation of the inner rectilinear motion barrel 8. Thus, tolerance of each component scarcely affects the motion of the lens barrel. Backlash among components can be reduced. Accordingly, the region in which the connector 7b is placed is configured between two components. Thus, the space in which the connector 7b is placed can be formed very stable.

More specifically, if the connector 7b is placed in the direction of arrow B so as to meet the following conditions, the connector 7b can be placed on a side surface of the third group barrel 7e without affecting the motion of the lens barrel.

Conditions:

The inner circumference of the region is placed at a position at which the part cut out from the fourth lens holder 15 doesn't affect a photographed image; and The outer circumference thereof is placed within a zone in which the inner rectilinear motion barrel 8 is placed.

With the above configuration of the region, the present embodiment has an advantage that it is not necessary to place the connector 7e between the third group unit 5 and the fourth group lens unit 13. Accordingly, a distance F illustrated in FIG. 4 can be reduced. The thickness of the lens barrel in a retracted state can be reduced, and the camera can be miniaturized by minimizing the distance F when the power supply is turned off.

In addition, in the lens barrel, a high-reflectivity component such as a flexible printed circuit board is not placed between the third group unit (moving-unit) 5 and the fourth group lens unit (base-unit) 13. Thus, in the lens barrel, an unwanted ghost phenomenon doesn't occur. In addition, a camera having good optical performance can be provided.

In addition, if in the lens barrel, a region (part) D of the inner rectilinear motion barrel 8 is cut out, good rigidity of the lens barrel is obtained. More specifically, the inner rectilinear motion barrel 8 needs to have rigidity sufficient for the first group photographing lens 1, the second group lens holder 4, and the third group unit 5 to stably and rectilinearly advance and retreat, as described above.

If the lens barrel has a structure in which a part of the lens barrel provided around the third group unit 5 is rotated, a space indicated by dashed lines E in FIG. 10A should be cut out over the entire circumference as a space in which the connector 7b is placed. In this state, the rigidity of the third group barrel 7e is small. Thus, the rigidity of the entire lens barrel becomes small, so that driving of the photographing lens becomes unstable.

As compared with this case, according to the present exemplary embodiment, only the region D is cut out, as described above. Accordingly, the present exemplary embodiment doesn't impair rigidity. More specifically, the present exemplary embodiment is preferable and effective since the connector 7b is placed on a side surface part of the third group barrel 7e and a configuration of the present exemplary embodiment doesn't impair rigidity.

In short, a compact lens barrel adapted to minimize the distance F between the third group unit 5 and the fourth group lens unit 13, which is illustrated in FIG. 10B, can be configured by placing the connector 7b in the space defined by the third group barrel 7e and the inner rectilinear motion barrel 8. In addition, with this configuration, the rigidity isn't impaired or reduced. Consequently, the driving of the lens barrel can be stabilized.

Figure 12:
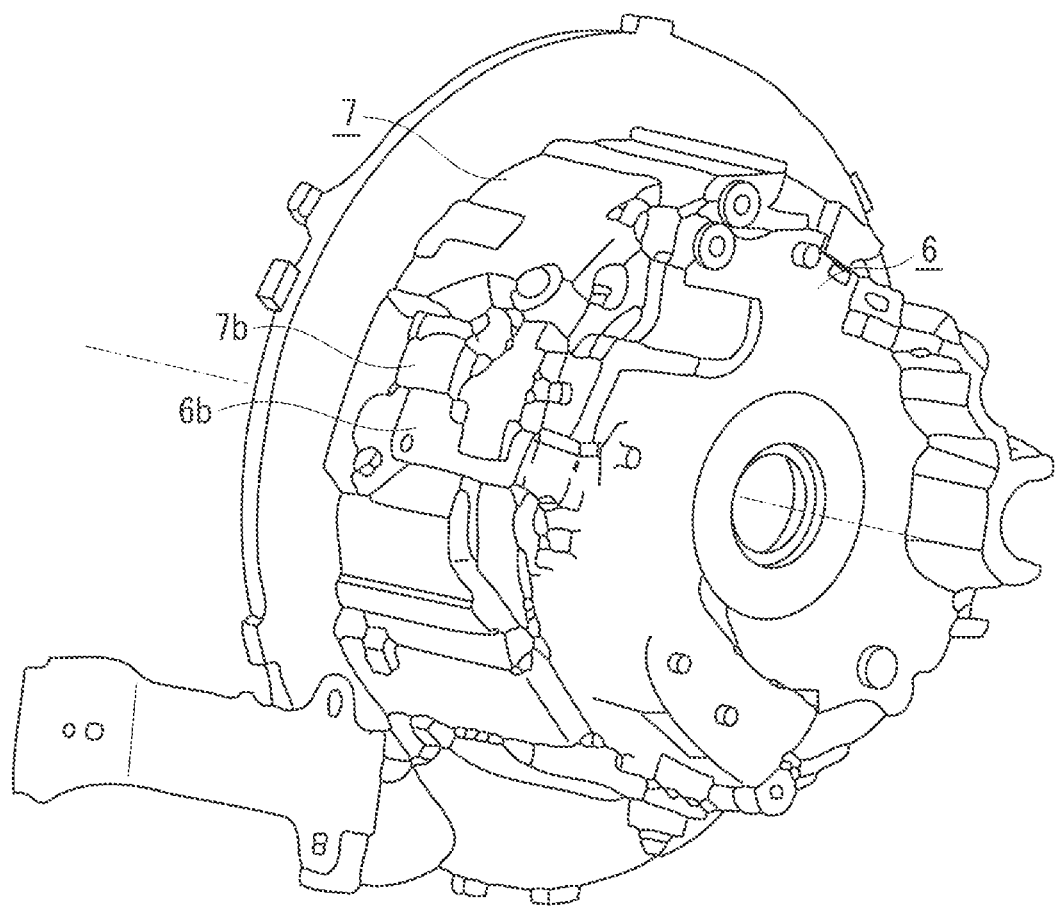
FIG. 12 is a perspective view illustrating an assembled state of the third group lens unit of the lens barrel according to the exemplary embodiment of the present invention.

Next, an assembling process of the third group lens unit 7 is described herein with reference to FIG. 12. In the third group lens unit 7, the extension part 6b of the second flexible printed circuit board 6a attached to the stop-shutter unit 6 is connected to the connector 7b on a side surface of the third group barrel 7e. More specifically, the second flexible printed circuit board 6a is configured to include a flat-surface part 6a connected to the actuator, which has a flat surface perpendicular to the optical axis, and the extension part 6b having a surface parallel to the optical axis.

The stop mechanism and the shutter mechanism (electric components) of the stop-shutter unit 7 require inspecting and adjusting in the assembling process. Accordingly, the stop-shutter unit 7 should communicate with external inspecting and adjusting devices via the flexible printed circuit board 6a to perform inspecting and adjusting operations.

At that time, a place is needed, in which the external inspecting and adjusting devices are connected to the second flexible printed circuit board 6a. However, if the external inspecting and adjusting devices are connected thereto on the stop-shutter unit 6, a load is imposed thereon at the time of connecting the external inspecting and adjusting devices. Consequently, there is a worry about deterioration of the accuracy in inspecting and adjusting the external devices. In addition, if a connection part dedicated to connection to the external inspecting and adjusting devices is provided on the second flexible printed circuit board, the area of the second flexible printed circuit board is increased. This leads to an increase in the cost of the lens barrel.

Thus, the present exemplary embodiment is configured such that the first flexible printed circuit board and the second flexible printed circuit board are connected to each other at the side surface part of the third group barrel 7e.

Figure 13:
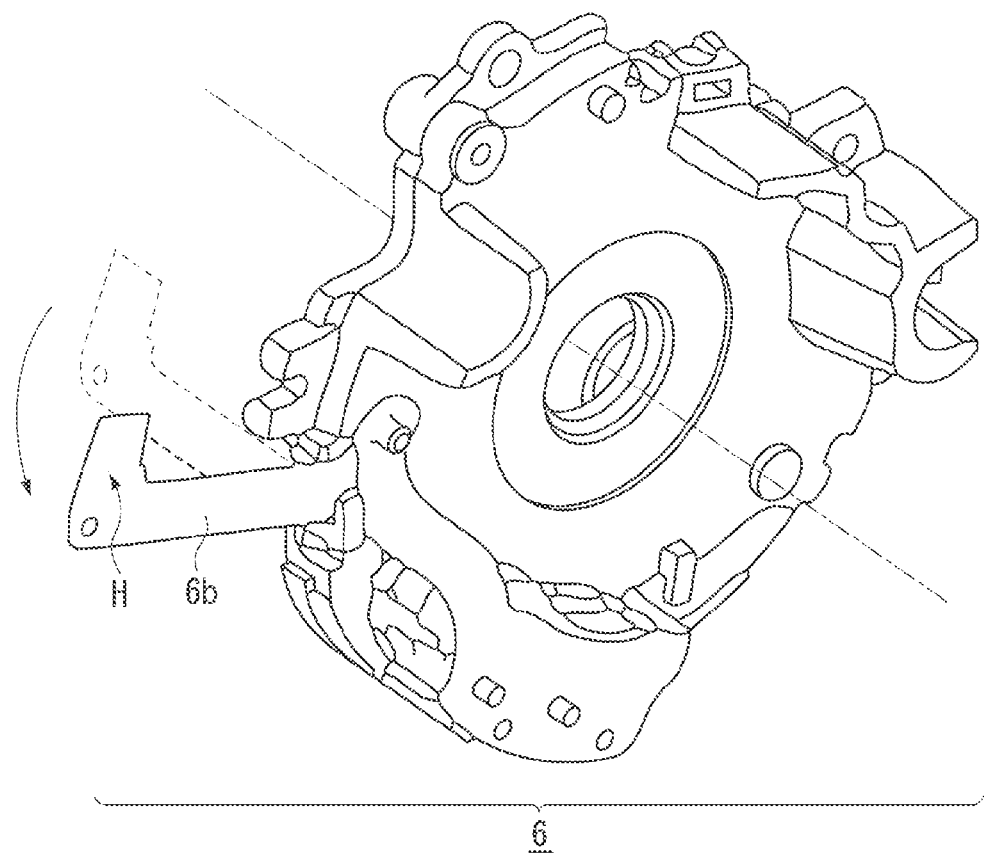
FIG. 13 is an explanatory view illustrating a second flexible printed circuit board of the stop-shutter unit according to the exemplary embodiment of the present invention.

Consequently, the second flexible printed circuit board 6a is connected to the external inspecting and adjusting devices outside the region of the stop-shutter unit 6 in the assembling process. Thus, as indicated by dashed lines in FIG. 13, the extension part 6b of the second flexible printed circuit board 6a is bent in the direction of an arrow illustrated in FIG. 13. Then, a part H of the second flexible printed circuit board 6a becomes connectable to the external inspecting and adjusting devices. In this state, when the external inspecting and adjustment devices are connected to the stop-shutter unit 6, inspection and adjustment can be carried out without the applying an unwanted load. Accordingly, if the lens barrel is configured as described above, unnecessary time and effort are not taken in the assembling process. The cost thereof can be reduced.

Figure 14A:
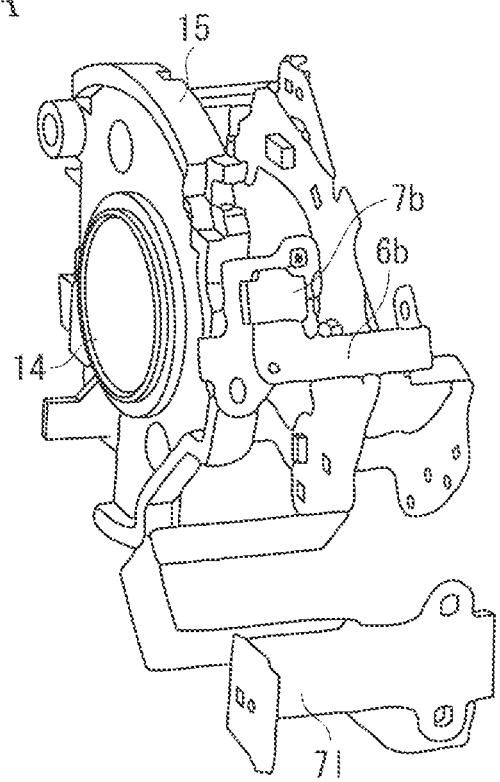
FIG. 14A is a perspective view illustrating the relationship among a first flexible printed circuit board, the second flexible printed circuit board, and a fourth group lens holder according to the exemplary embodiment of the present invention.
Figure 14B:
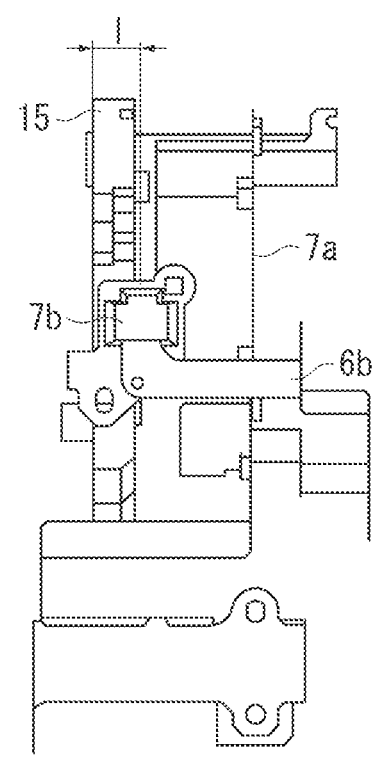
FIG. 14B is a side view illustrating the relationship among the first flexible printed circuit board, the second flexible printed circuit board, and the fourth group lens holder according to the exemplary embodiment of the present invention.

As illustrated in FIGS. 14A and 14B, the extension part 6b of the second flexible printed circuit board 6a is configured to reduce its length. Thus, the cost can be reduced.

When the lens barrel is assembled, the extension part 6b of the second flexible printed circuit board 6a is arranged to overlap with a region I located in the direction of the optical axis of the fourth group lens holder 15 that is placed closer to the imaging plane side than the flat-surface part of the second flexible printed circuit board 6a. If the lens barrel is configured in this manner, the fourth group lens holder 15 performs only rectilinear advancement and retreatment. Thus, an operation of the fourth group lens holder 15 is not hindered.

In addition, the extension part 6b can promote a sufficient length to connect the external inspecting and adjusting devices to the second flexible printed circuit board 6a. Additionally, the extension part 6b can be configured to be shorter as compared with a case where the part 6b is extended from the stop-shutter unit 6 towards the object side. Accordingly, in such a case where the extension part 6b is shorter, the cost of the second flexible printed circuit board 6a can be reduced. If the second flexible printed circuit board 6 can be miniaturized, the second flexible printed circuit board 6 may be connected to the first flexible printed circuit board 7a at a place closer to the object side than the flat-surface part of the first flexible printed circuit board 7a.

In the present exemplary embodiment, the lens at the imaging plane side of the third group barrel 7e is the fourth group lens unit 13. However, similar advantages can be obtained by connecting the fourth group lens unit 13 to the second flexible printed circuit board 6a at a place closer to the image plane side than the second flexible printed circuit board 6a.

In addition, the size of the entre second flexible printed circuit board 6a can be reduced by configuring the extension part 6b of the second flexible printed circuit board 6a in the stop-shutter unit 6 to be short. Thus, low-priced products can be provided. Consequently, even when two flexible printed circuit boards are used, a lens barrel can be provided at a low price. In other words, if the extension part 6b is configured to be short, as described above, operations of the lens barrel are not hindered and good assemblability of the lens barrel is achieved. The cost of the second flexible printed circuit board 6a can be reduced.

In addition, as described above, according to the present exemplary embodiment, the second flexible printed circuit board 6a is connected to the connector 7b in the lens barrel. Thus, the flexible printed circuit board to be drawn out of the lens barrel and connected to the system controller side is only the single first flexible printed circuit board 7a. Accordingly, as compared with the two-ply board, the resilience can be reduced. Thus, if the resilience of the flexible printed circuit board is reduced, the lens barrel can stably be driven since resistance due to the flexible printed circuit board is reduced, which is caused by moving the third group barrel 7e.

In addition, the flexible printed circuit board to be drawn out from the inside of the lens barrel to the outside is only the single first flexible printed circuit board 7a. Thus, the number of the flexible groove 12c provided in the driving barrel 12 can be one piece and impairment of the rigidity of the driving barrel 12 can be prevented.

In addition, in the lens barrel, the first flexible printed circuit board 7a and the second flexible printed circuit board 6a are arranged at places corresponding to different phases in the direction of rotation around the optical axis. With such arrangement of the flexible printed circuit boards, the flexibility of pattern-arrangement of the flexible printed circuit boards can be enhanced.

In the foregoing description of the present invention, the connection of the first flexible printed circuit board and the second flexible printed circuit board is performed by the connector. As long as the flexible printed circuit boards can electrically be connected to each other, the connection can also be performed by soldering. However, generally, since the connection by connector can be performed in a narrow space, the connection by connector is suitable for compact lens barrels.

As described above, if the configuration according to the present exemplary embodiment is employed, compact high-rigidity lens barrels can be provided. In addition, the number of the long flexible printed circuit board to be extended to the outside of the lens barrel is one piece. Consequently, the cost of the lens barrel can be reduced.

The number of signal lines of the stop-shutter unit (second electric component) is smaller, as compared with signal lines of the camera-shake correction mechanism (first electric component). Consequently, the size of the flexible printed circuit board can be reduced. Accordingly, the configuration in which the flexible printed circuit boards of the stop-shutter unit are connected to each other by the connector is suitable for the lens barrel, as compared with other configurations.

According to the present exemplary embodiment, the lens barrel is configured such that the camera-shake correction unit is electrically connected to the first flexible printed circuit board 7a, and that the stop-shutter unit is electrically connected to the second flexible printed circuit board 6a. However, as long as the connection is made between the flexible printed circuit board and each actuator provided within the lens barrel, the configuration can appropriately be changed.

The present exemplary embodiment is configured such that the second flexible printed circuit board 6a is connected to the first flexible printed circuit board 7a. However, depending on arrangement of the flexible printed circuit boards, a reverse configuration can be employed, in which the first flexible printed circuit board 7a is connected to the second flexible printed circuit board 6a.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-181720 filed Aug. 16, 2010, which is hereby incorporated by reference herein in its entirety.

What is claimed is:

1. A barrel body comprising:
   a first barrel;
   a second barrel which is contained by the first barrel;
   a first flexible printed circuit board electrically connected to a first actuator;
   a second flexible printed circuit board electrically connected to a second actuator; and
   a connection unit configured to connect the first flexible printed circuit board and the second flexible printed circuit board,
   wherein the connection unit is placed in a space configured by the first barrel and the second barrel.

2. The barrel body according to claim 1, wherein the first actuator connected to the first flexible printed circuit board is a camera-shake correction driving coil, and
   wherein the second actuator connected to the second flexible printed circuit board is an actuator corresponding to a stop shutter.

3. The barrel body according to claim 1, wherein the connection unit includes a connector.

4. The barrel body according to claim 1, wherein the barrel body includes an opening for discharging a third flexible printed circuit board electrically connected to the connection unit to the outside of the barrel body.

5. A photographing apparatus comprising:
   a first barrel;
   a second barrel which is contained by the first barrel;
   a first flexible printed circuit board electrically connected to a first actuator;
   a second flexible printed circuit board electrically connected to a second actuator; and a connection unit configured to connect the first flexible printed circuit board and the second flexible printed circuit board, wherein the connection unit is placed in a space configured by the first barrel and the second barrel.

* * * * *